United States Patent
Choi et al.

(10) Patent No.: US 10,034,158 B2
(45) Date of Patent: Jul. 24, 2018

(54) METHOD OF MAINTAINING INTERNET PROTOCOL (IP) CONNECTIVITY IN LOW POWER INTERNET OF THINGS (IOT) COMMUNICATION DEVICE BASED ON NEAR FIELD COMMUNICATION (NFC), AND DEVICE OPERATING THE SAME

(71) Applicant: Electronics and Telecommunications Research Institute, Daejeon (KR)

(72) Inventors: Young Hwan Choi, Daejeon (KR); Yong Geun Hong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/335,577

(22) Filed: Oct. 27, 2016

(65) Prior Publication Data
US 2017/0311119 A1 Oct. 26, 2017

(30) Foreign Application Priority Data

Apr. 22, 2016 (KR) .......................... 10-2016-0049421
Aug. 11, 2016 (KR) .......................... 10-2016-0102155

(51) Int. Cl.
*H04W 4/80* (2018.01)
*H04L 29/08* (2006.01)

(52) U.S. Cl.
CPC ............... *H04W 4/80* (2018.02); *H04L 67/12* (2013.01); *H04L 67/2842* (2013.01); *H04L 69/324* (2013.01); *Y02D 70/144* (2018.01); *Y02D 70/166* (2018.01); *Y02D 70/22* (2018.01); *Y02D 70/26* (2018.01)

(58) Field of Classification Search
None
See application file for complete search history.

(56) References Cited

U.S. PATENT DOCUMENTS

| | | | | | |
|---|---|---|---|---|---|
| 8,036,108 | B2 * | 10/2011 | Kim | ...................... | H04W 80/06 370/229 |
| 8,315,218 | B2 * | 11/2012 | Kim | .................... | H04W 36/385 370/329 |
| 8,315,219 | B2 * | 11/2012 | Kim | .................... | H04L 63/0892 370/329 |
| 8,472,348 | B2 * | 6/2013 | Hui | ..................... | H04L 41/0806 370/235 |
| 8,724,490 | B2 * | 5/2014 | Drake | ...................... | G06F 1/32 370/252 |

(Continued)

FOREIGN PATENT DOCUMENTS

KR 10-2016-0004918 1/2016

*Primary Examiner* — Gregory B Sefcheck
(74) *Attorney, Agent, or Firm* — Kile Park Reed & Houtteman PLLC

(57) ABSTRACT

Provided is a method and device for low power networking based on near field communication (NFC). The device for low power networking based on NFC may include an adaptation layer for the NFC configured to request a link layer node identification (ID), and a logical link layer including a binding to NFC for returning the link layer node ID to the adaptation layer for the NFC to secure an internet protocol (IP) connectivity in response to a request for the link layer node ID.

10 Claims, 4 Drawing Sheets

(56) References Cited

U.S. PATENT DOCUMENTS

| | | | | |
|---|---|---|---|---|
| 8,743,879 B2* | 6/2014 | Haddad | H04L 61/6072 | |
| | | | 370/392 | |
| 8,787,832 B2* | 7/2014 | Herron | H04W 8/005 | |
| | | | 455/127.4 | |
| 8,908,666 B2* | 12/2014 | Nixon | H04L 45/74 | |
| | | | 370/338 | |
| 8,971,810 B2* | 3/2015 | Herron | H04W 8/005 | |
| | | | 455/127.4 | |
| 9,026,187 B2* | 5/2015 | Huang | H05K 5/0086 | |
| | | | 455/575.8 | |
| 9,083,565 B2* | 7/2015 | Wang | H04L 12/403 | |
| 9,122,903 B2* | 9/2015 | Mourtel | G06K 7/0008 | |
| 9,130,910 B1* | 9/2015 | Logue | H04L 63/0428 | |
| 9,208,676 B2* | 12/2015 | Fadell | G05B 19/042 | |
| 9,246,757 B2* | 1/2016 | Balog | H04L 12/2807 | |
| 9,325,382 B2* | 4/2016 | Arunan | H04L 61/20 | |
| 9,332,040 B2* | 5/2016 | Logue | G08B 25/10 | |
| 9,472,093 B2* | 10/2016 | Popa | G01D 4/006 | |
| 9,596,708 B2* | 3/2017 | Logue | G08B 25/10 | |
| 9,602,391 B2* | 3/2017 | Wang | H04L 12/403 | |
| 9,613,512 B2* | 4/2017 | Williams | G08B 13/24 | |
| 9,838,525 B2* | 12/2017 | Bietz | H04M 1/7253 | |
| 9,948,703 B2* | 4/2018 | Olivier | H04L 67/1095 | |
| 2007/0109997 A1 | 5/2007 | Hong et al. | | |
| 2008/0107067 A1 | 5/2008 | Baek et al. | | |
| 2014/0167978 A1* | 6/2014 | Popa | G01D 4/006 | |
| | | | 340/870.02 | |
| 2015/0074228 A1* | 3/2015 | Drake | H04W 92/02 | |
| | | | 709/218 | |
| 2016/0007398 A1* | 1/2016 | Choi | H04W 4/008 | |
| | | | 370/310 | |
| 2017/0063566 A1* | 3/2017 | Seminario | H04L 12/2816 | |
| 2017/0237835 A1* | 8/2017 | Savolainen | H04L 69/167 | |
| | | | 709/245 | |
| 2017/0295503 A1* | 10/2017 | Govindaraju | H04W 24/02 | |

\* cited by examiner

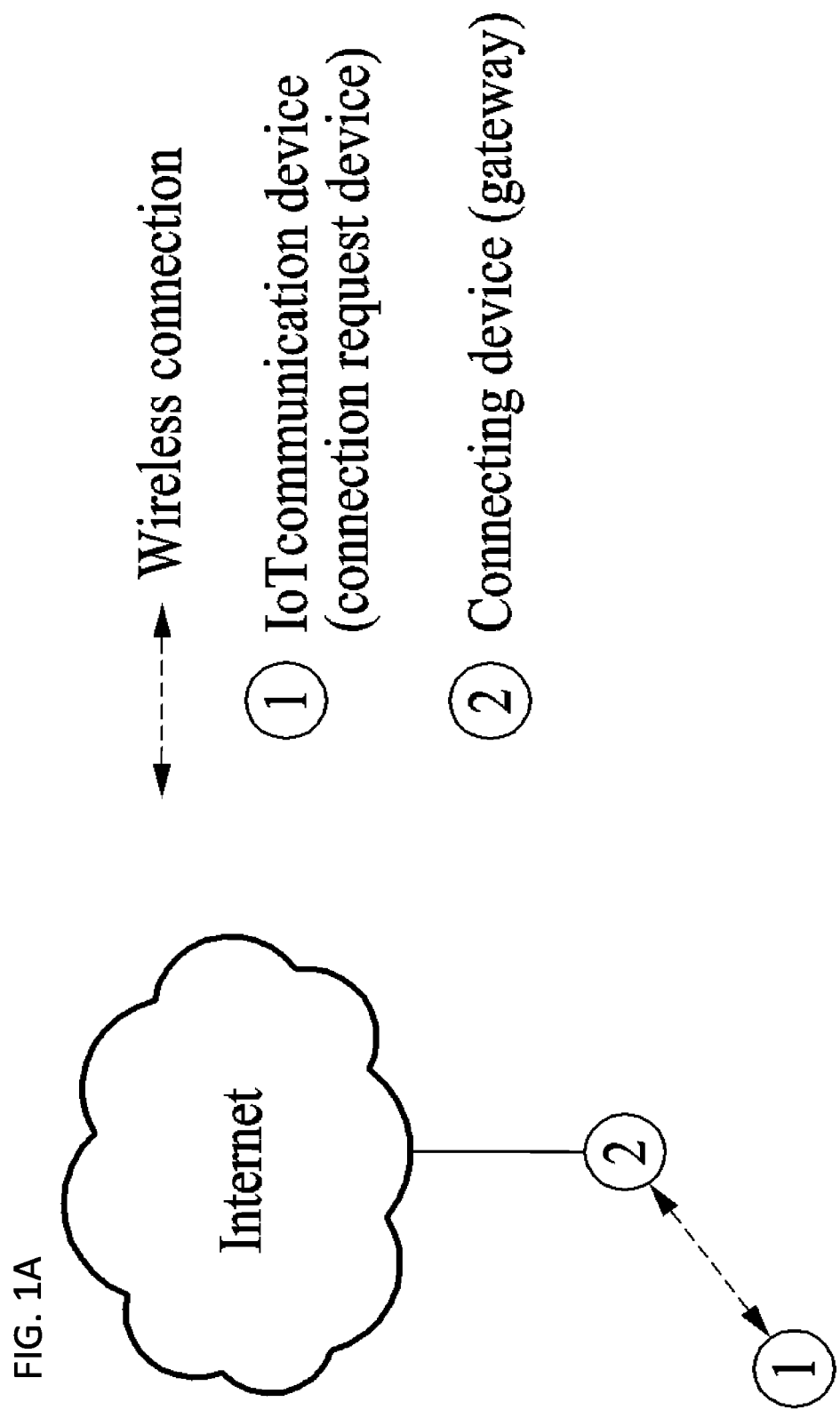

METHOD OF MAINTAINING INTERNET PROTOCOL (IP) CONNECTIVITY IN LOW POWER INTERNET OF THINGS (IOT) COMMUNICATION DEVICE BASED ON NEAR FIELD COMMUNICATION (NFC), AND DEVICE OPERATING THE SAME

CROSS-REFERENCE TO RELATED APPLICATIONS

This application claims the priority benefit of Korean Patent Application No. 10-2016-0049421 filed on Apr. 22, 2016, in the Korean Intellectual Property Office, and Korean Patent Application No. 10-2016-0102155 filed on Aug. 11, 2016, in the Korean Intellectual Property Office, the disclosures of which are incorporated herein by reference for all purposes.

BACKGROUND

1. Field

One or more example embodiments relate to an Internet of Things (IoT) based networking field that uses internet based low power wireless technology, and more particularly, to a method of maintaining an internet protocol (IP) connectivity for maintaining a service.

2. Description of Related Art

An Internet Protocol version 6 (IPv6) address may include a most significant 64-bit prefix address and an interface identifier (IID) corresponding to a 64-bit area. The IID may be a device identification (ID) used for identification in a local network. The IPv6 address may provide the upper 64-bit prefix for network identification and form a total 128-bit global unique address.

However, in an IPv6 packet transmission method for a low power device being developed by IETF 6lo WG, an IPv6 IID generation method for IPv6 packet transmission based on G9959, a near field communication (NFC), and a Master-slave/Token-passing (MS/TP) network transmission method may simply utilize a link layer address of a device to correspond to a lowest unit.

In a case of the NFC, "FFFE(16)" may be allocated to a middle portion of a 64-bit IID area, and a least significant 6-bit area may be appended as an NFC link layer address, for example, a source service access point (SSAP) of a logical link control (LLC). The remaining areas may be filled with all zeroes.

However, a 6-bit node corresponding to an NFC link layer address is an address obtained by logically and temporarily generating a physical address without using the physical address permanently. Thus, whenever a connectivity between same devices is attempted, a different IID is generated based on a different node ID. Therefore, communication is performed using different IPv6 addresses whenever the connection is performed.

NFC technology is enhanced technology for intercommunication based on a radio frequency identification (RFID) technology. NFC technology may be used for a permission service, a verification service, and a mobile payment service that verify an ID with a quick touch, besides a streaming service for transmitting large volumes of multimedia or large numbers of files.

When a service is required which is not terminated by a temporal touch and that requests a connectivity through an IP address even when a number of intentional touches are required, a problem may occur.

For example, with the NFC, two terminals capable of physically communicating when within 10 cm of each other may be connectable. However, when the two terminals are not within a communication distance because of an outside physical obstruction and there is no IP connectivity, data transmission may need to be performed again from the beginning.

Where there is no outside physical obstruction, the data may be consecutively transmitted by the number of intentional touches. For example, the NFC may provide a wireless communication service within a short distance, and the wireless communication may block a wireless control attempt made by an invisible hacker. In this example, a single piece of data may be divided and transmitted through the number of intentional touches while an IP connection is maintained. For such case, a method of maintaining the IP connection is required.

SUMMARY

An aspect provides a selective internet protocol (IP) connectivity in response to a request based on service characteristics.

According to an aspect, there is provided a device for low power networking based on near field communication (NFC), the device including an adaptation layer for the NFC configured to request a link layer node identification (ID), and a logical link layer including a binding to NFC for returning the link layer node ID to the adaptation layer for the NFC to secure an internet protocol (IP) connectivity in response to a request for the link layer node ID.

The adaptation layer for the NFC may check the IP connectivity and transmit a result of the checking to the binding to NFC.

When the IP connectivity is requested, the binding to NFC may return a link layer node ID stored in a cache to the adaptation layer for the NFC.

When the link layer node ID is absent from the cache, a new link layer node ID may be generated and stored in the cache, and the new link layer node may be returned to the adaptation layer for the NFC.

When the IP connectivity is not requested, a cache may be empty, and a newly generated link layer node ID may be returned to the adaptation layer for the NFC.

According to an aspect, there is provided a method of maintaining an internet protocol (IP) connectivity in a device for low power networking based on near field communication (NFC), the method including requesting a link layer node identification (ID) by an adaptation layer for the NFC, and returning the link layer node ID to the adaptation layer for the NFC to secure an IP connectivity in response to a request for the link layer node ID by a binding to NFC included in a logical link layer.

The method may further include checking, by the adaptation layer for the NFC, the IP connectivity and transmitting a result of the checking to the binding to NFC.

When the IP connectivity is requested, the returning may include returning, by the binding to NFC, a link layer node ID stored in a cache to the adaption layer for the NFC.

When the link layer node ID is absent from the cache, the returning may further include generating and storing, by the binding to NFC, a new link layer node ID in the cache and returning the new link layer node ID to the adaptation layer for the NFC.

When the IP connectivity is not requested, the returning may include emptying, by the binding to NFC, a cache and returning a newly generated link layer node ID to the adaptation layer for the NFC.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIGS. 1A and 1B illustrate network environments of an Internet of Things (IoT) communication device according to an example embodiment;

DETAILED DESCRIPTION

Figure 1B:
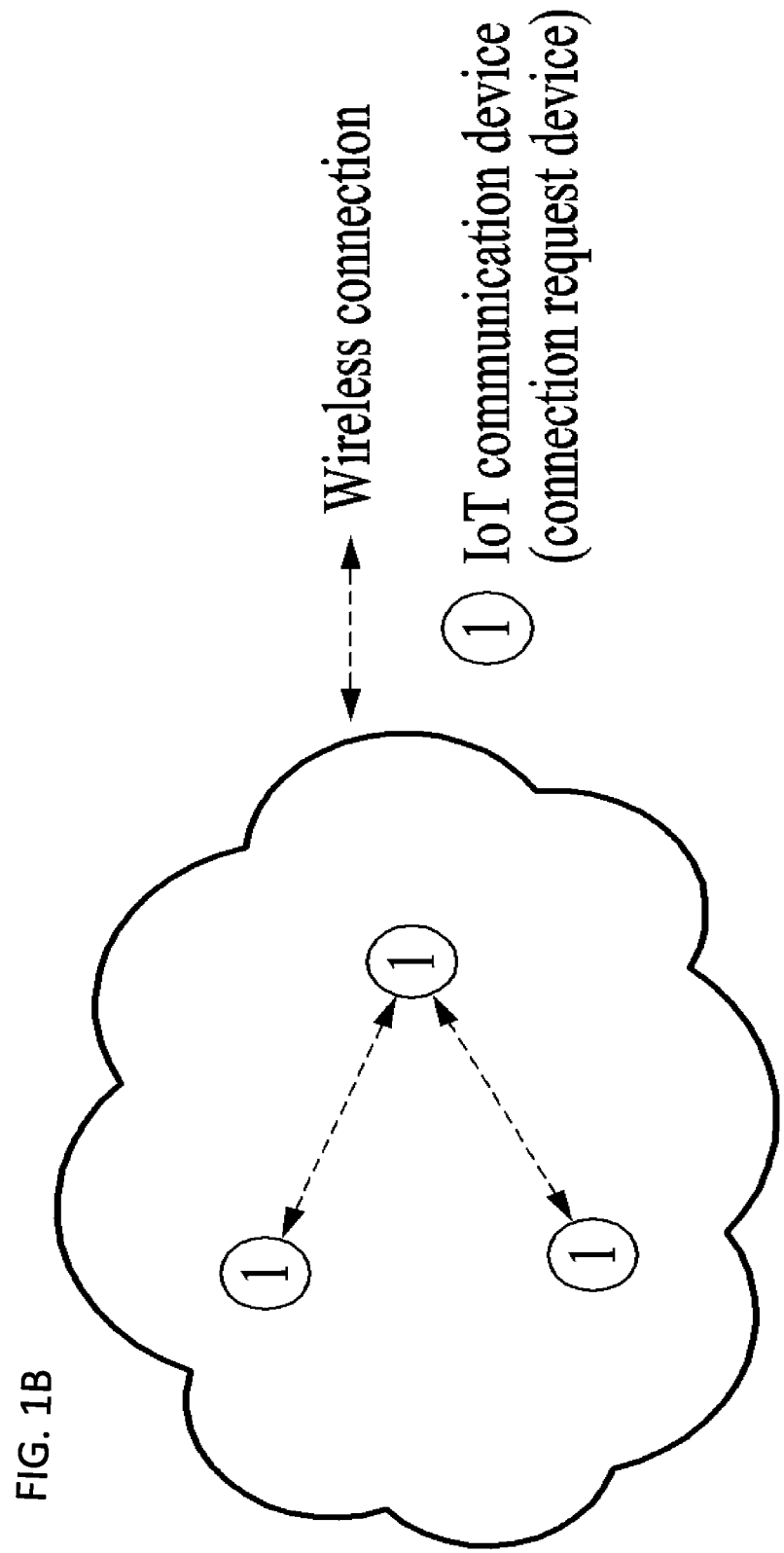

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

FIGS. 1A and 1B illustrate network environments of an Internet of Things (IoT) communication device according to an example embodiment.

Referring to FIGS. 1A and 1B, the IoT communication device provides a network, for example, a low power wire-wireless network. The IoT communication device may be a low power wireless communication device. For example, the IoT communication device may be a communication device based on a low power wire-wireless network interface technology such as G9959, near field communication (NFC), and Master-slave/Token-passing (MS/TP). The IoT communication device may be an NFC device. The IoT communication device may be provided in a personal computer (PC), a data server, or a portable device.

The portable device may be provided in a laptop computer, a cellular phone, a smartphone, a tablet PC, a mobile internet device (MID), a personal digital assistant (PDA), an enterprise digital assistant (EDA), a digital still camera, a digital video camera, a portable multimedia player (PMP), a personal navigation device (PND) or a portable navigation device (PND), a handheld game console, an e-book, or a smart device. The smart device may be provided in a smartwatch or a smartband.

In an example, as illustrated in FIG. 1A, the IoT communication device is directly connected to a connecting device and thereby connected to the Internet. The connecting device (or a gateway) may include an access router, an access point (AP), a base station, and a dongle. For example, the dongle may indicate a universal serial bus (USB) dongle, a Bluetooth dongle, an NFC dongle, a Miracast dongle in addition to all wireless dongles connectable to the Internet. The connecting device may indicate all devices to provide a network environment for a communication to the IoT communication device.

In another example, as illustrated in FIG. 1B, a plurality of IoT devices provides an independent ad-hoc network (or a multihop network). Each of the IoT devices may be or may not be connected to a neighbor terminal device of another network.

A plurality of NFC wireless communication terminals may provide an independent ad-hoc network (or a multihop network).

Figure 2:
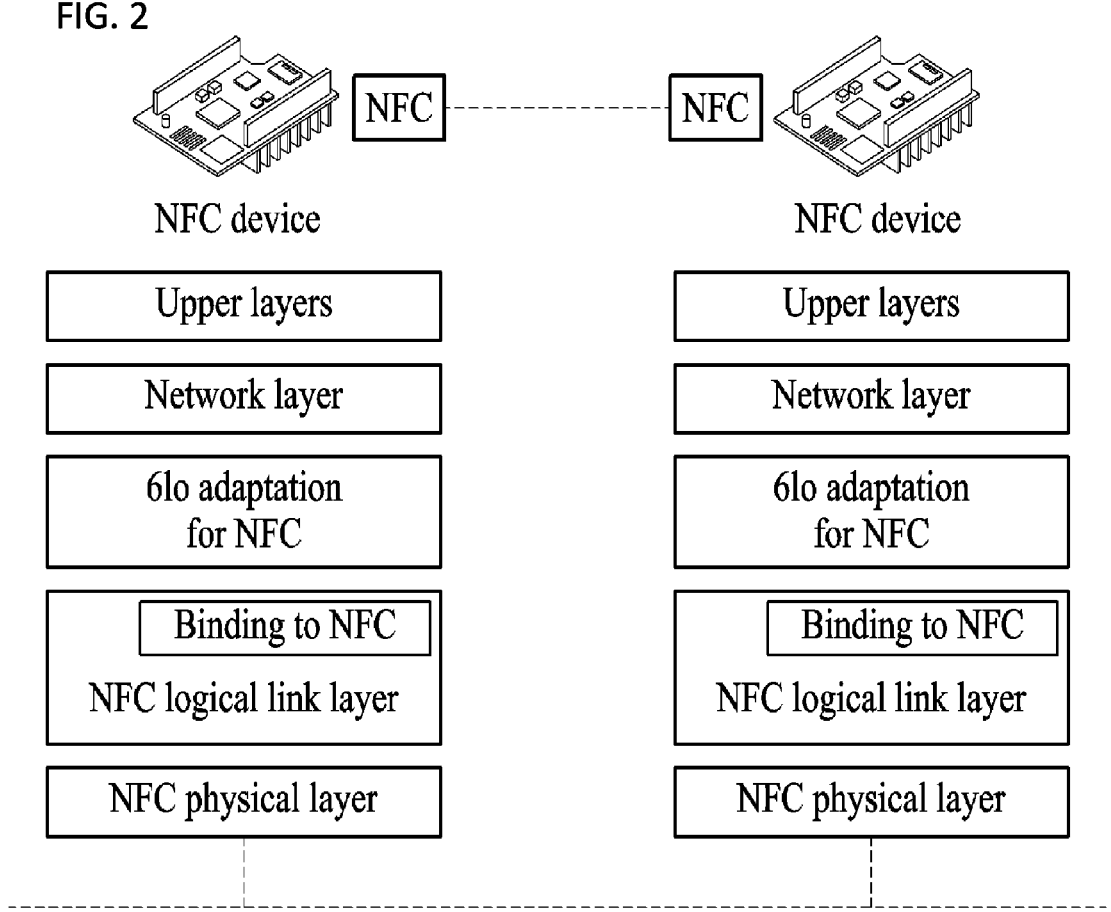
FIG. 2 illustrates near field communication (NFC) based communication protocol stacks and an additional function according to an example embodiment.

FIG. 2 illustrates near field communication (NFC) based communication protocol stacks and an additional function according to an example embodiment. FIG. 2 illustrates operation protocol stacks that form a link session between two Internet of Things (IoT) communication devices, for example, NFC communication terminal devices. Referring to FIG. 2, an NFC device, that is, the NFC communication terminal device may include protocol stacks of FIG. 2 for transmission of packets based on NFC wireless technology. Upper layers may include transport protocols, for example, a transmission control protocol (TCP) and a user datagram protocol (UDP), an application layer, and other protocols capable of running on top of a network layer, for example, an Internet Protocol version 6 (IPv6) layer. A logical link layer (or a data link layer) and a physical layer for transmitting packets, for example, an NFC packet, below the network layer may be present.

The adaptation layer may be required between the network layer and the logical link layer to transmit the packets, for example, an IPv6 packet, based on the NFC wireless technology. For the low power networking based on NFC, the NFC communication terminal device may include an adaption layer for NFC.

The adaptation layer for NFC may be a protocol layer required for transmitting and receiving datagrams, for example, packets, generated by the network layer through a lower layer. For example, the adaption layer for NFC may correspond to the adaptation layer for IPv6 based on NFC, thereby transmitting and receiving IPv6 datagrams, for example, packets, generated by the network layer through the lower layer.

The logical link layer of the NFC communication terminal device may include an additional binding to NFC function to secure an Internet protocol (IP) connectivity. The binding to NFC function may indicate an IPv6 binding function combined to the NFC.

The binding to NFC function is as follows.

The binding to NFC function may bind a logical link layer address of the NFC, for example, an NFC device, to the adaptation layer. For example, the binding to NFC function may transmit, to the adaptation layer, a 6-bit node ID address corresponding to the logical link layer address formed on an NFC logical link layer for generating an interface identifier (IID) of IPv6.

The binding to NFC function may perform caching on the logical link layer address for an IP continuity requested by the upper layers for network connection. For example, the binding to NFC function may include a caching function for temporarily storing the 6-bit node ID address corresponding to the logical link layer address.

The binding to NFC function may correct the logical link layer address on the logical link layer by reusing the logical link layer address on which cashing is performed for the IP continuity requested by the upper layers. For example, the binding to NFC function may reuse a 6-bit node ID stored in a cache and correct a node ID on the logical link layer.

Figure 3:
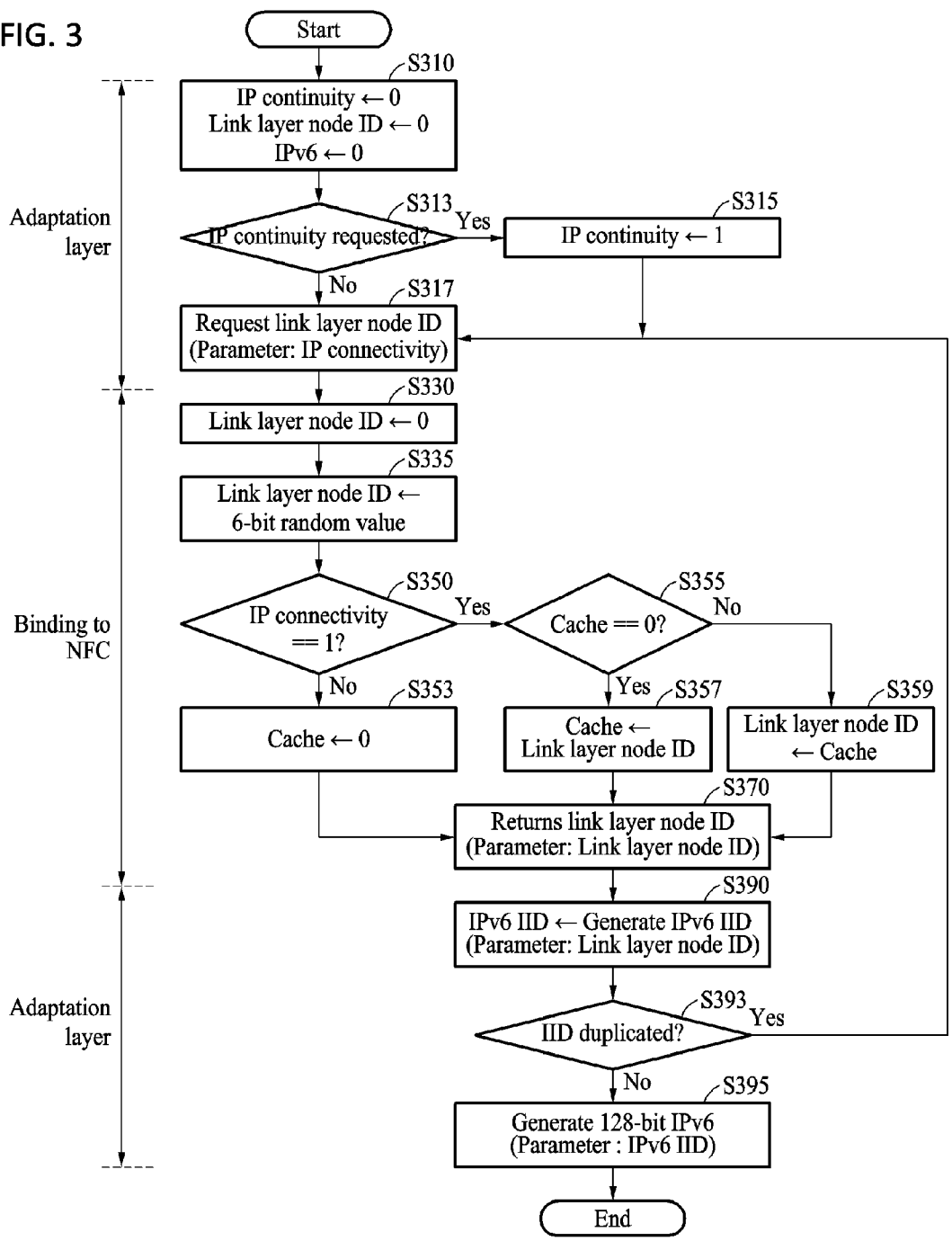
FIG. 3 is a flowchart illustrating an algorithm for requesting a link layer node identification (ID) for an internet protocol (IP) connectivity and an algorithm for generating and returning the link layer node ID according to an example embodiment.

FIG. 3 is a flowchart illustrating an algorithm for requesting a link layer node identification (ID) for an internet protocol (IP) connectivity and an algorithm for generating and returning the link layer node ID according to an example embodiment.

Referring to FIG. 3, an algorithm may be performed on a binding to NFC function on an adaptation layer and a logical link layer to secure a selective IP connectivity.

In operation S310, the adaptation layer includes information on IP continuity, information on a link layer node ID, and information on an Internet Protocol version 6 (IPv6) interface identifier (IID). In FIG. 3, for ease and convenience of descriptions, it is assumed that the information on the IP continuity corresponds to a logic 0 (or a value 0), the information on the link layer node ID corresponds to a logic 0, and the IPv6 IID corresponds to a logic 0. The information on the IP continuity corresponding to the logic 0 may indicate that the IP continuity is not requested, the information on the link layer node ID corresponding to the logic 0 may indicate that the information on the link layer node ID is absent, and the information on the IPv6 IID corresponding to the logic 0 may indicate that the information on the IPv6 IID is absent.

In operation S313, the adaptation layer checks whether the IP continuity is requested. Subsequently, in operation S317, the adaptation layer requests a logical link node ID to a binding to NFC on the logical link layer corresponding to a lower link layer to generate an IPv6 address.

A result of the checking may be transmitted to the binding to NFC. When the IP continuity is not requested, the adaption layer may maintain the information on the IP continuity to be the logic 0. In operation S315, when the IP continuity is requested, the adaptation layer indicates the information on the IP continuity as a logic 1 being a logical level. In operation S317, the adaptation layer requests the logical link node ID and information on the IP connectivity corresponding to the logic 1 indicating the result of the checking whether the IP connectivity is requested.

The binding to NFC on the logical link layer may return (or reply) the link layer node ID to the adaptation layer in response to a request for the link layer node ID.

In operation S330, the binding to NFC on the logical link layer includes the link layer node ID. In FIG. 3, for ease and convenience of descriptions, it is assumed that the binding to NFC includes the link layer node ID corresponding to the logic 0 (or the value 0).

In operation S335, the binding to NFC generates the link layer node ID corresponding to a 6-bit random value.

In operation S350, the binding to NFC checks the IP connectivity. For example, the binding to NFC checks whether the IP connectivity is requested.

In an example, when the IP connectivity is requested, the binding to NFC checks whether the link layer node ID is stored in a cache in operation S355. In operations S359 and S370, the binding to NFC returns the link layer node ID stored in the cache to the adaptation layer. The link layer node ID stored in the cache may be reused and returned to the adaptation layer.

When the cache is empty, a new link layer node ID is generated and stored in the cache in operation S357, and the new link layer node ID is returned to the adaptation layer in operation S370. For example, the new link layer node ID may be a 6-bit node ID generated as a random value.

In another example, when the IP connectivity is not requested, the cache is empty in operation S353, and the new link adaptation node ID is returned to the adaptation layer in operation S370.

In operation S390, the adaptation layer generates the IPv6 IID using the link layer node ID returned from the binding to NFC.

Subsequently, in operation S393, the adaptation layer checks whether an IID is duplicated. In operation S317, the adaptation layer requests the logical link node ID to the binding to NFC on the logical link layer corresponding to a lower link layer when a result of the checking in operation S393 indicates that the IID is duplicated.

In operation S395, the adaptation layer generates a 128-bit IPv6 based on the IID when the result of the checking in operation S393 indicates that the IID is not duplicated.

As described above, it is possible to develop various high value services that effectively use an IPv6 packet transmission method based on a low power wired-wireless network through a stable IP connectivity based on NFC and to provide an application service through safe communication of terminals because private data is protected from a threat of an invisible hacker.

The components described in the exemplary embodiments of the present invention may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the exemplary embodiments of the present invention may be achieved by software, and the software may be recorded on a recording medium. The components, the functions, and the processes described in the exemplary embodiments of the present invention may be achieved by a combination of hardware and software.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The method according to the above-described embodiments of the present invention may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A device for low power networking based on near field communication (NFC), the device comprising:
 a processor; and
 a non-transitory computer-readable media including program instructions to implement:
 an adaptation layer for the NFC configured to request a link layer node identification (ID); and
 a logical link layer including a binding to NFC for returning the link layer node ID to the adaptation layer for the NFC to secure an internet protocol (IP) connectivity in response to a request for the link layer node ID,
 wherein the adaptation layer for the NFC generates an Internet Protocol version 6 (IPv6) interface identifier (IID) using the link layer node ID returned to the adaptation layer for the NFC,
 wherein, when the IP connectivity is requested, the binding to NFC returns a link layer node ID stored in a cache to the adaptation layer for the NFC, and
 when the IP connectivity is not requested, a cache is emptied, and a newly generated link layer node ID is returned to the adaptation layer for the NFC without being stored in the cache,
 wherein, when the IP connectivity is requested and if the link layer node ID is absent from the cache, a new link layer node ID is generated and stored in the cache, and the new link layer node ID is returned to the adaptation layer for the NFC.

2. The device of claim 1, wherein the adaptation layer for the NFC checks the IP connectivity and transmits a result of the checking to the binding to NFC.

3. The device of claim 1, wherein the adaptation layer checks whether the IID is duplicated.

4. The device of claim 3, wherein, when a result of the checking indicates that the IID is duplicated, the adaptation layer for the NFC requests the link layer ID.

5. The device of claim 3, when the result of the checking indicates that the IID is not duplicated, the adaptation layer generates a 128-bit IPv6 based on the IID.

6. A method of maintaining an internet protocol (IP) connectivity in a device for low power networking based on near field communication (NFC), the method comprising:
   requesting a link layer node identification (ID) by an adaptation layer for the NFC;
   returning the link layer node ID to the adaptation layer for the NFC to secure an IP connectivity in response to a request for the link layer node ID by a binding to NFC included in a logical link layer; and
   generating an Internet Protocol version 6 (IPv6) interface identifier (IID) using the link layer node ID returned to the adaptation layer for the NFC by the adaptation layer for the NFC,
   wherein the returning comprises:
   returning, by the binding to NFC, a link layer node ID stored in a cache to the adaptation layer for the NFC when the IP connectivity is requested, and
   emptying, by the binding to NFC, a cache and returning a newly generated link layer node ID to the adaptation layer for the NFC when the IP connectivity is not requested,
   wherein, when the IP connectivity is requested and if the link layer node ID is absent from the cache, the returning further comprises generating and storing, by the binding to NFC, a new link layer node ID in the cache and returning the new link layer node ID to the adaptation layer for the NFC.

7. The method of claim 6, further comprising:
   checking, by the adaptation layer for the NFC, the IP connectivity and transmitting a result of the checking to the binding to NFC.

8. The method of claim 6, wherein the adaptation layer checks whether the IID is duplicated.

9. The method of claim 8, wherein, when a result of the checking indicates that the IID is duplicated, the adaptation layer for the NFC requests the link layer ID.

10. The method of claim 8, wherein, when the result of the checking indicates that the IID is not duplicated, the adaptation layer generates a 128-bit IPv6 based on the IID.

\* \* \* \* \*